(12) United States Patent
Peer et al.

(10) Patent No.: US 7,423,642 B2
(45) Date of Patent: Sep. 9, 2008

(54) EFFICIENT VIDEO FRAME CAPTURING

(75) Inventors: Joram Peer, Herzlia (IL); Yoel Hayon, Givatayim (IL)

(73) Assignee: Winbond Electronics Corporation, Hsinchu (TW)

(*) Notice: Subject to any disclaimer, the term of this patent is extended or adjusted under 35 U.S.C. 154(b) by 202 days.

(21) Appl. No.: 11/304,931

(22) Filed: Dec. 14, 2005

(65) Prior Publication Data
US 2007/0132771 A1    Jun. 14, 2007

(51) Int. Cl.
G06T 15/40 (2006.01)
(52) U.S. Cl. ........................ 345/422; 345/545
(58) Field of Classification Search ................ 345/419, 345/422, 545
See application file for complete search history.

(56) References Cited

U.S. PATENT DOCUMENTS

| | | | |
|---|---|---|---|
| 5,127,064 A * | 6/1992 | Flinois et al. ............... | 382/149 |
| 5,608,656 A * | 3/1997 | Purcell et al. ............... | 708/203 |
| 5,619,597 A * | 4/1997 | Moreton ..................... | 382/296 |
| 5,691,770 A * | 11/1997 | Keesman et al. ....... | 375/240.04 |
| 5,854,636 A * | 12/1998 | Watanabe et al. ........... | 345/519 |
| 5,920,356 A * | 7/1999 | Gupta et al. ................ | 348/606 |
| 6,259,817 B1 * | 7/2001 | Ahmad ....................... | 382/236 |
| 6,304,895 B1 | 10/2001 | Schneider et al. | |
| 6,378,009 B1 | 4/2002 | Pinkston, II et al. | |
| 6,633,905 B1 | 10/2003 | Anderson et al. | |
| 6,681,250 B1 | 1/2004 | Thomas et al. | |
| 6,697,429 B2 | 2/2004 | Provitola | |
| 6,717,576 B1 * | 4/2004 | Duluk et al. ............... | 345/419 |
| 6,989,823 B1 * | 1/2006 | Lasneski ..................... | 345/204 |
| 7,167,181 B2 * | 1/2007 | Duluk et al. ............... | 345/506 |
| 7,262,818 B2 * | 8/2007 | Chuang et al. ............. | 348/790 |
| 2003/0135656 A1 | 7/2003 | Schneider et al. | |
| 2004/0083256 A1 | 4/2004 | Chang | |
| 2004/0130552 A1 * | 7/2004 | Duluk et al. ................ | 345/506 |
| 2005/0007452 A1 * | 1/2005 | McKay et al. .............. | 348/143 |
| 2005/0105608 A1 | 5/2005 | Coleman et al. | |
| 2005/0114894 A1 | 5/2005 | Hoerl | |
| 2005/0190977 A1 * | 9/2005 | Jeon et al. ................... | 382/239 |
| 2006/0067410 A1 * | 3/2006 | Park et al. .............. | 375/240.25 |
| 2006/0159181 A1 * | 7/2006 | Park et al. .............. | 375/240.24 |
| 2007/0110303 A1 * | 5/2007 | Bhattacharjya et al. ..... | 382/166 |
| 2007/0147804 A1 * | 6/2007 | Zhang et al. ................ | 386/131 |

(Continued)

OTHER PUBLICATIONS www.realvnc.com, Aug. 22, 2006.

(Continued)

Primary Examiner—Javid A Amini
(74) Attorney, Agent, or Firm—Darby & Darby PC

(57) ABSTRACT

A method for capturing images includes associating the pixels with tiles. An input data sequence representing respective current values of the pixels of a currently-captured image frame is accepted. Within each of at least some of the tiles, the current values are compared with respective reference values of the pixels of a reference frame stored in a frame buffer in order to detect variations between the current and reference values.

When a variation is detected at a given pixel, the current value is written into the frame buffer in place of a corresponding reference value, and the tile is marked as a changed tile. Subsequent pixel values belonging to the changed tile are written into the frame buffer without comparing the current values of the subsequent pixels to the respective reference values, thereby replacing the reference frame with the currently-captured image frame.

21 Claims, 3 Drawing Sheets

U.S. PATENT DOCUMENTS

2007/0189382 A1* 8/2007 Park et al. .............. 375/240.08

OTHER PUBLICATIONS www.pepper.com, Aug. 22, 2006.
www.avocent.com, Aug. 22, 2006.
http://www.realvnc.com/pipermail/vnc-list/1999-January/004158.html.
T. Breitfeld, "Remote Control of Blade with KVM-over-IP", 4th Annual Blade Summit, Santa Clara, 2005.
http://www.realvnc.com/pipermail/vnc-list/1999-January/004112.html.

* cited by examiner

EFFICIENT VIDEO FRAME CAPTURING

FIELD OF THE INVENTION

The present invention relates generally to remote control of computing platforms, and particularly to methods and systems for efficient capturing of video frames in remote computer control applications.

BACKGROUND OF THE INVENTION

Capturing of images, and in particular video images, is performed in a variety of applications. For example, some remote control applications transfer video frames from a remotely-controlled computer to a controlling computer. Some of these applications also transfer mouse and keyboard signaling from the controlling computer to the controlled computer. Such remote control applications are often referred to as keyboard-video-mouse (KVM) applications.

Remote frame buffer (RFB) is an exemplary open-source protocol used for remotely interacting with a computer. Virtual Network Computing (VNC) is an exemplary remote control software package, offered by RealVNC Ltd. (Cambridge, England), that uses the RFB protocol. Details regarding RFB and VNC are available at www.realvnc.com.

Some remote control applications capture and process video frames in the controlled computer. For example, U.S. Patent Application Publication 2004/0083256 A1, whose disclosure is incorporated herein by reference, describes a system for real-time image transmission monitoring for use in a network system connecting a server and a client. A video graphics array (VGA) signal-gathering module gathers first and second frames from the client. Each frame is divided into a plurality of sub-frames and each sub-frame is numbered. Then, the contents of sub-frames having the same number in the first and second frames are compared, and the content of the variation sub-frame in the second frame and its corresponding number are output to the server if the contents are different.

U.S. Pat. No. 6,304,895, whose disclosure is incorporated herein by reference, describes a method and system for remotely accessing and controlling a target switch and/or a target computer using a target controller. The video information captured by the target controller is analyzed and compressed in order to reduce network traffic between the target controller and a controlling computer. U.S. Patent Application Publication 2005/0114894 A1, whose disclosure is incorporated herein by reference, describes a remote network management system for coupling a series of remote serial devices, servers and computers to one or more user workstations.

U.S. Patent Application Publication 2005/0105608 A1, whose disclosure is incorporated herein by reference, describes a method and apparatus for transmitting video signals from a remote computer to a local computer over a network. Signals from the remote computer are received, digitized, conditioned and compressed for efficient transmission over the network connection. The method and apparatus also utilize a cache of recently-transmitted video to further decrease the data needed for transmission of the signals. The conditioning and caching use frame buffers of video signals that are divided into cells to reduce noise in the image, and to limit the portions of the video signals that must be transmitted.

Several vendors offer hardware and/or software KVM solutions, such as KVM-over-IP solutions. Such vendors include, for example, Peppercom USA, Inc. (Tucker, Ga.) and Avocent Corp. (Huntsville, Ala.). Further details regarding these products can be found at www.peppercom.com and www.avocent.com, respectively.

SUMMARY OF THE INVENTION

Embodiments of the present invention provide improved methods and systems for capturing images. These methods and systems are used, for example, for transferring video frames from a remote computer to a controlling computer.

In some embodiments, the images are compressed "on the fly," i.e., during the capturing process, thus reducing latency in transmitting the captured and compressed images. Images are compressed by comparing a currently-captured image frame to a reference frame (e.g., a previously-captured frame) stored in a frame buffer. Each image is divided into multiple blocks, referred to herein as "tiles." Tiles containing pixel values that differ between the current and reference images are marked as changed tiles. When transmitting the captured images to a controlling computer, only the changed tiles are typically transmitted.

Unlike some known capturing and compression methods, the capturing methods described hereinbelow make particularly efficient use of memory by using only a single frame buffer, rather than separate buffers for the current and reference images. Moreover, the methods described hereinbelow significantly reduce the rate of write and read operations to and from the frame buffer, thus relaxing the requirements of the memory holding the frame buffer and of the memory bus handling these operations.

There is therefore provided, in accordance with an embodiment of the present invention, a method for capturing images that include pixels, the method including:

associating the pixels with tiles responsively to respective locations of the pixels in the images;

accepting an input data sequence representing respective current values of the pixels of a currently-captured image frame;

within each of at least some of the tiles, comparing the current values with respective reference values of the pixels of a reference frame stored in a frame buffer in order to detect variations between the current and reference values and, when a variation is detected at a given pixel, writing the current value into the frame buffer in place of a corresponding reference value and marking the tile as a changed tile; and writing the current values of the pixels belonging to the changed tile subsequent to the given pixel in the input data sequence into the frame buffer without comparing the current values of the subsequent pixels to the respective reference values, thereby replacing the reference frame with the currently-captured image frame in the frame buffer.

In an embodiment, associating the pixels with the tiles includes, while accepting the input data sequence, advancing one or more pixel counters that indicate the respective locations of the current pixels in the currently-captured image frame, and determining an association between the pixels and the tiles responsively to values of the one or more pixel counters.

In another embodiment, comparing the current values with the reference values includes calculating differences between the current and reference values, and comparing the differences to a difference threshold so as to detect the variations.

In yet another embodiment, associating the pixels with the tiles includes representing the tiles by a tile array including a bit matrix, and marking the tile as a changed tile includes setting a respective bit associated with the tile in the bit matrix.

In still another embodiment, accepting the input data sequence includes storing at least some of the current pixel values in an input FIFO, and the method further includes:

comparing a number of the pixel values stored in the input FIFO to a FIFO filling threshold; and when the number of the pixel values in the input FIFO exceeds the FIFO filling threshold, marking the tile associated with a currently-read pixel as a changed tile.

In an embodiment, comparing each of the current values with the respective reference value includes performing at least one read operation from the frame buffer, writing each of the current values includes performing at least one write operation to the frame buffer, and an average number of the read and write operations performed per pixel is no greater than 17/16. In another embodiment, the average number of the read and write operations performed per pixel is no greater than 257/256.

There is also provided, in accordance with an embodiment of the present invention, a method for transferring video frames that include pixels from a remote computer to a controlling computer, the method including:

associating the pixels with tiles responsively to respective locations of the pixels in the video frames;

at the remote computer, accepting an input data sequence representing respective current values of the pixels of a currently-captured video frame;

within each of at least some of the tiles, comparing at the remote computer the current values with respective reference values of the pixels of a reference frame stored in a frame buffer to detect variations between the current and reference values and, when a variation is detected at a given pixel, writing the current value into the frame buffer in place of a corresponding reference value and marking the tile as a changed tile;

at the remote computer, writing the current values of the pixels belonging to the changed tile subsequent to the given pixel in the input data sequence into the frame buffer without comparing the current values of the subsequent pixels to the respective reference values, thereby replacing the reference frame with the currently-captured image frame in the frame buffer; and transmitting at least some of the changed tiles over a communication link from the remote computer to the controlling computer.

In an embodiment, transmitting the at least some of the changed tiles includes transmitting a given changed tile to the controlling computer in parallel to a processing of tiles subsequent to the given tile in the currently-captured video frame.

In another embodiment, the method includes reconstructing the video frames responsively to the changed tiles at the controlling computer. Additionally or alternatively, the method includes controlling the remote computer from the controlling computer using the reconstructed video frames.

In still another embodiment, the method includes identifying a high activity tile corresponding to a frequently-changing region in the video frames, and marking the high activity tile as a changed tile so as to cause the current values of the pixels belonging to the high activity tile to be written to the frame buffer without comparing them to the respective reference values.

There is additionally provided, in accordance with an embodiment of the present invention, apparatus for capturing images that include pixels, including:

a memory controller, which is arranged to write and read pixel values into and out of a memory holding a frame buffer; and a capture control module, which is arranged to associate the pixels with tiles responsively to respective locations of the pixels in the images, to accept an input data sequence representing respective current values of the pixels of a currently-captured image frame, to compare within each of at least some of the tiles the current values with respective reference values of the pixels of a reference frame stored in the frame buffer in order to detect variations between the current and reference values and, when a variation is detected at a given pixel, to write the current value into the frame buffer in place of a corresponding reference value, to mark the tile as a changed tile, and to write the current values of the pixels belonging to the changed tile subsequent to the given pixel in the input data sequence into the frame buffer without comparing the current values of the subsequent pixels to the respective reference values, thereby replacing the reference frame with the currently-captured image frame in the frame buffer.

There is further provided, in accordance with an embodiment of the present invention, a computer, including:

a memory, which is arranged to hold a frame buffer for storing reference pixel values of a reference image frame; and a capture processor for capturing images that include pixels generated at the computer, which is arranged to associate the pixels with tiles responsively to respective locations of the pixels in the images, to accept an input data sequence representing respective current values of the pixels of a currently-captured image frame, to compare within each of at least some of the tiles the current values with the respective reference values stored in the frame buffer in order to detect variations between the current and reference values and, when a variation is detected at a given pixel, to write the current value into the frame buffer in place of a corresponding reference value, to mark the tile as a changed tile, and to write the current values of the pixels belonging to the changed tile subsequent to the given pixel in the input data sequence into the frame buffer without comparing the current values of the subsequent pixels to the respective reference values, thereby replacing the reference frame with the currently-captured image frame in the frame buffer.

There is also provided, in accordance with an embodiment of the present invention, a system for transferring video frames that include pixels, including:

a remote computer, including:

a memory, which is arranged to hold a frame buffer for storing reference pixel values of a reference video frame;

a capture processor, which is arranged to associate the pixels with tiles responsively to respective locations of the pixels in the frames, to accept an input data sequence representing respective current values of the pixels of a currently-captured frame, to compare within each of at least some of the tiles the current values with the respective reference values stored in the frame buffer in order to detect variations between the current and reference values and, when a variation is detected at a given pixel, to write the current value into the frame buffer in place of a corresponding reference value, to mark the tile as a changed tile, and to write the current values of the pixels belonging to the changed tile subsequent to the given pixel in the input data sequence into the frame buffer without comparing the current values of the subsequent pixels to the respective reference values, thereby replacing the reference frame with the currently-captured frame in the frame buffer; and a communication controller, which is arranged to transmit output data including at least some of the changed tiles over a communication link; and a controlling computer, which is arranged to receive the at least some of the changed tiles transmitted over the communication link and to reconstruct the currently-captured video frame responsively to the received output data.

The present invention will be more fully understood from the following detailed description of the embodiments thereof, taken together with the drawings in which:

DETAILED DESCRIPTION OF EMBODIMENTS

System Description

Figure 1:
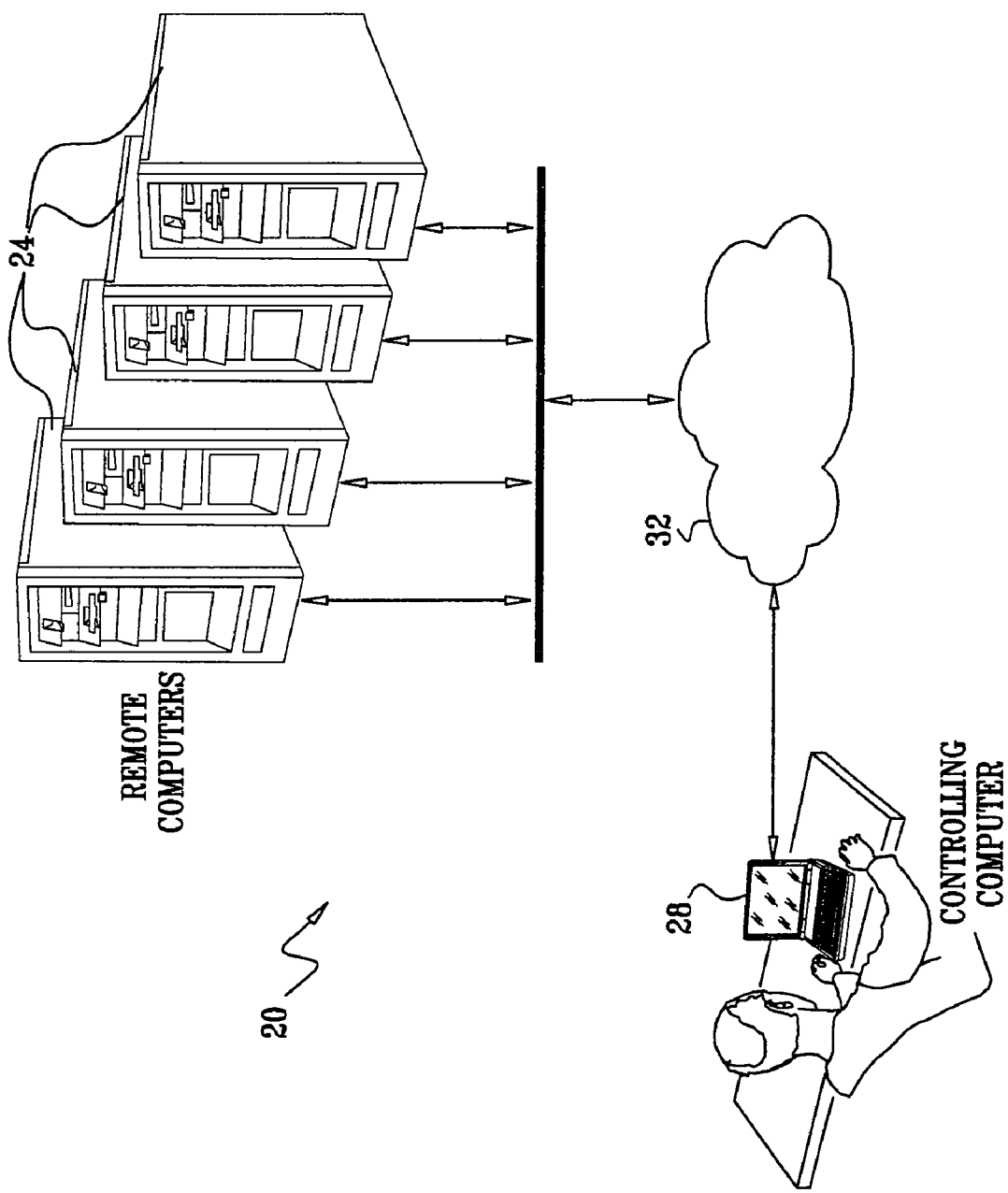
FIG. 1 is a block diagram that schematically illustrates a system for transferring video from a remote computer, in accordance with an embodiment of the present invention.

FIG. 1 is a block diagram that schematically illustrates a system 20 for transferring video from remote computers 24, in accordance with an embodiment of the present invention. Each remote computer 24 captures and transmits video frames, using methods and devices that are described in detail hereinbelow, to a controlling computer 28 over a communication link 32. (The terms "frames" and "images" are used interchangeably hereinbelow.)

Typically, an operator of system 20 can view the video frames generated by each remote computer 24 on a video display of controlling computer 28. In some embodiments, the video capturing and transmission of system 20 are part of a remote control system, such as a keyboard-video-mouse (KVM) system, in which the operator remotely controls remote computers 24. In such systems, keyboard and/or mouse signaling is transmitted over communication link 32 to the appropriate remote computer 24. Alternatively, system 20 may be used as a monitoring application that transfers video only. In some embodiments, the video frames transferred to the controlling computer are formatted in accordance with a known protocol, such as the RFB protocol cited above.

In the exemplary application shown in FIG. 1, remote computers 24 comprise a plurality of servers in a clustered configuration. A system administrator or other operator uses controlling computer 28 to remotely monitor and/or control the operation of the servers. Communication link 32 in this example comprises a local area network (LAN) interconnecting the servers, and a wide-area network (WAN), such as the Internet, over which the controlling computer communicates with the servers.

The configuration shown in FIG. 1 is an exemplary configuration, which is shown purely for the sake of conceptual clarity. In some embodiments, remote computer 24 may comprise a personal computer, a laptop, a workstation, a server, a blade in a multi-processor frame, or any other suitable computing platform that outputs video frames. For simplicity of explanation, the description that follows will refer to a single remote computer 24 and a single controlling computer 28. System 20 may comprise, however, any number of remote computers 24, as well as one or more controlling computer 28. The term "remote computer" means that computer 24 and computer 28 are separate computing platforms, and does not imply any distance relationship between them. Controlling computer 28 may be located either in proximity to or remotely from remote computer 24.

Communication link 32 may comprise any suitable link that connects controlled computer 24 with controlling computer 28, such as an internet protocol (IP) network, a LAN, a WAN, a packet network, a point-to-point or point-to-multipoint connection, a wired or wireless connection, a dial-up or a fixed connection, or a combination of these connection types.

Figure 2:
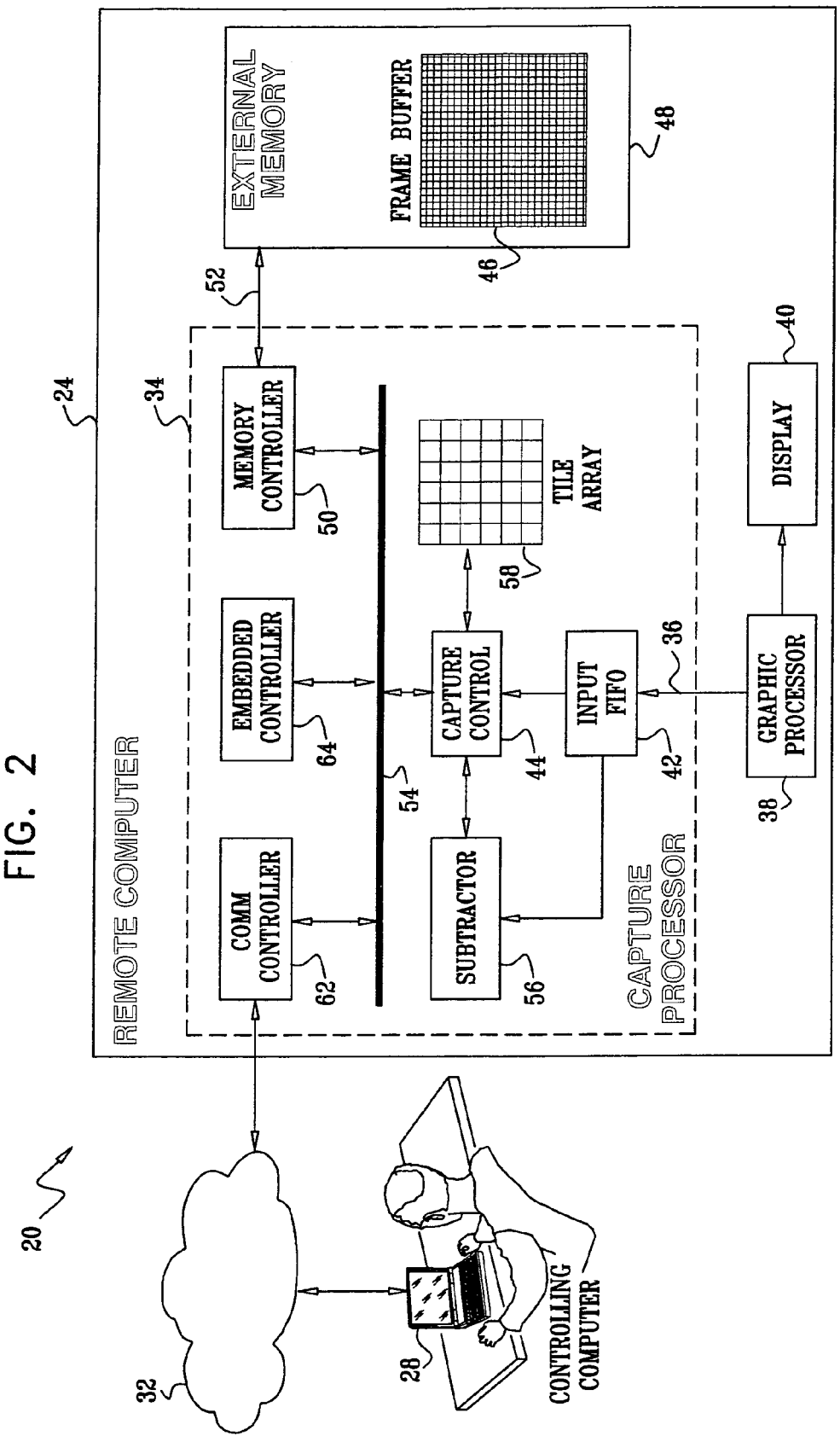
FIG. 2 is a block diagram that schematically illustrates details of a remote computer, in accordance with an embodiment of the present invention.

FIG. 2 is a block diagram that schematically illustrates details of remote computer 24, in accordance with an embodiment of the present invention. Computer 24 comprises a capture processor 34, which captures, compresses and transmits the video images generated in computer 24 to controlling computer 28 over link 32. Capture processor 34 accepts video frames via a video input interface 36. The video frames are typically generated by a graphic processor 38 of the remote computer. In some embodiments, the remote computer comprises a local display 40, which displays the video frames locally, in parallel to the video transmitted to controlling computer 28. Alternatively, such as in the server cluster example of FIG. 1 above, computer 24 does not include a local video display.

In some embodiments, capture processor 34 is implemented as an integrated circuit (IC), such as an application-specific IC (ASIC), which is part of remote computer 24. Alternatively, processor 34 may be integrated, along with other functions, into a baseboard management controller (BMC) chip. Further alternatively, processor 34 may be fabricated using discrete components or as a combination of discrete components and ICs in remote computer 24. In some embodiments, capture processor 34 may reside either on the motherboard or on an extension board of the remote computer. Further alternatively, at least some of the circuitry and/or functions of capture processor 34 may be integrated with other hardware components of the remote computer.

Each video frame provided to capture processor 34 is represented as a plurality of pixels. In some embodiments, the capture processor accepts an input data sequence, which comprises a sequence of pixel values representing the currently-captured video frame. The specific format of the input data sequence depends on several factors, including the screen resolution used by the remote computer, the color resolution used, the number of bits selected to represent each pixel value and the frame refresh rate.

Typically, capture processor 34 accepts video frames having a resolution of between 640 by 480 and 1280 by 1024 pixels per frame, although other ranges can also be used. Each pixel value is typically represented using 16 bits, although other pixel resolutions are also feasible. The frame refresh rate handled by the capture processor is typically between 25 and 160 Hz, although any other suitable refresh rate can be used. In some embodiments, the video provided to capture processor 34 adheres to a known digital graphics standard, such as a video graphics array (VGA), super VGA (SVGA), extended graphic array (XGA), as well as other video electronics standards association (VESA) display standards.

The input data sequence is written into an input FIFO 42. FIFO 42 mediates, as will be explained below, between the constant rate of the pixel values written into the FIFO and the variable rate of pixel values read from the FIFO. Typically, the size of FIFO 42 (i.e., the maximum number of pixel values that can be stored in it) is chosen to correspond to approximately ¼ to ½ of a video line, although other suitable sizes can also be used. In some embodiments, each video line in the video frames provided to processor 34 ends with a time period used for horizontal blanking, during which no pixel data is provided. Input FIFO 42 inherently reduces the effective pixel rate by averaging the pixel rate over these blanking periods.

In order to reduce the communication bandwidth used for transferring the video frames over communication link 32, a capture control module 44 in capture processor 34 compresses the video frames received from remote computer 24 before transmitting them to controlling computer 28. The compression is based on detecting variations between pixel values of a previously-captured frame (referred to as reference pixel values of a reference frame) with corresponding pixel values of the currently-captured frame (referred to as current pixel values). An exemplary method for simultaneous frame capturing and compression carried out by capture processor 34 is described in detail in FIG. 3 below.

During the capturing and compression process, the capture processor stores the reference frame in a frame buffer 46. The size of frame buffer 46 is chosen so as to hold a single video frame. In some embodiments, frame buffer 46 comprises an address space in an external memory 48 of the remote computer, residing externally to capture processor 34. External memory 48 may be implemented using any suitable memory technology, such as synchronous dynamic random access memory (SDRAM) or double data rate (DDR) SDRAM. In alternative embodiments, as described further below, frame buffer 46 may be implemented internally to the capture processor using an embedded on-chip memory array, such as using a dynamic RAM (DRAM) device.

The capture processor comprises a memory controller 50, which performs the writing and reading of pixel values into and out of frame buffer 46 over a memory bus 52. In some embodiments, memory controller 50 is connected to capture control module 44, and to other components of capture processor 34, via an internal bus 54. Typically, module 44 is defined as the master of the internal bus.

Unlike some known compression methods and systems that use two frame buffers for storing the reference and current frames, the method of FIG. 3 below uses a single frame buffer 46, thus reducing memory space requirements in the remote computer. Unlike some known methods and systems that perform compression only after the current frame has been captured, the method of FIG. 3 below performs simultaneous capturing and compression, thus reducing both memory requirements and latency in transmitting the captured and compressed frames. Moreover, the method of FIG. 3 significantly reduces the rate of read and write operations from and to frame buffer 46, thus relaxing the performance requirements of the memory holding the frame buffer and of memory bus 52.

When a current video frame is to be captured, the input data sequence is provided to processor 34 over interface 36. At the same time as the current pixel values are being written into input FIFO 42, capture control module 44 reads the current pixel values from the output of FIFO 42 and compares them with corresponding reference pixel values of the reference frame stored in frame buffer 46.

A subtractor 56 accepts corresponding pairs of current and reference pixel values, and determines whether or not the pixel values differ. In some embodiments, the subtractor computes the absolute difference between the current and reference pixel values, and compares this difference to a predetermined difference threshold. If the absolute difference exceeds the threshold, the subtractor concludes that a pixel variation occurred. Alternatively, any other suitable method of comparing pixel values and detecting pixel variations can be used.

The compression process carried out by capture processor 34 takes into account the fact that consecutive video frames are often similar to one another, and that variations between consecutive frames are often limited to certain locations in the frame. In order to take advantage of these assumptions, each of the reference and current video frame is divided into a plurality of blocks, referred to herein as tiles. In some embodiments, only tiles that have changed in comparison to the reference frame (referred to as changed tiles) are transmitted to the controlling computer.

In some embodiments, each tile is 16 by 16 pixels in size, although other tile sizes can also be used. Tiles may be either square (i.e., having equal height and width) or rectangular (i.e., having different height and width). In general, the tiles need not all have the same size or shape. For example, when compressing 1280 by 1024 pixel frames into 16 by 16 pixel tiles, each frame is divided into 80 by 64, or 5120 tiles.

The capture processor comprises a tile array 58 comprising a bit matrix, in which each bit corresponds to a tile of the current frame. In some embodiments, tile array 58 is implemented using a static random access memory (SRAM) device, although any other suitable memory device can be used for this purpose. The capture control module sets and resets the bits of tile array 58 to mark the tiles of the current frame as changed tiles (i.e., containing pixel values that differ from their respective reference pixel values). The bits of tile array 58 are also referred to as difference bits.

The use of tile array 58 in the simultaneous capturing and compression process is described in detail in FIG. 3 below. Typically, the values of the pixels associated with the changed tiles are compressed, encrypted and formatted into output data, which is then transmitted to controlling computer 28. Capture processor 34 comprises an embedded controller 64, which reads the changed tiles from the frame buffer. The embedded controller typically compresses, encrypts and formats the output data into IP packets. The capture processor comprises a communication controller 62, which transmits the formatted output data over communication link 32 to controlling computer 28. In some embodiments, communication controller 62 transmits Ethernet frames whose payloads contain the output data.

In some embodiments, the embedded controller also performs various management tasks of capture processor 34 such as system initialization, handling of configuration changes, handling of multi-client tasks, etc. In some embodiments, embedded controller 64 determines when a new current frame is to be captured. Additionally, in embodiments in which capture processor 34 is part of a KVM system, embedded controller 64 typically performs additional tasks related to the processing of mouse and/or keyboard data. Such tasks are considered to be outside the scope of the present invention.

In some embodiments, certain tiles in the frame may be identified as high activity tiles corresponding to regions in the frame that change frequently. The pixel values of the high activity tiles typically change frequently from one frame to another. High-activity tiles may be identified to the capture processor in advance, such as during initialization. Alternatively, embedded controller 64 may automatically mark certain tiles as high activity tiles during operation, such as by monitoring the indices of changed tiles over time.

In these embodiments, embedded controller 64 pre-sets bits in tile array 58 that correspond to high activity tiles, thereby marking them as changed tiles a-priori. The a-priori marking of high activity tiles as changed tiles causes these tiles to be written into the frame buffer and sent to the controlling computer without the need to compare every pixel of these tiles in the current and reference frames. As a result, the rate of read operations performed over memory bus 52, as well as the computational load on capture control module 44, are reduced. In some embodiments, embedded controller 64 may decide how often the high activity tiles are to be sent to communication controller 62 (and to controlling computer 28). Reducing the rate of transmission of the high activity tiles reduces both the data rate over communication link 32 and the computational load on communication controller 62.

Frame Capturing Method Description

Figure 3:
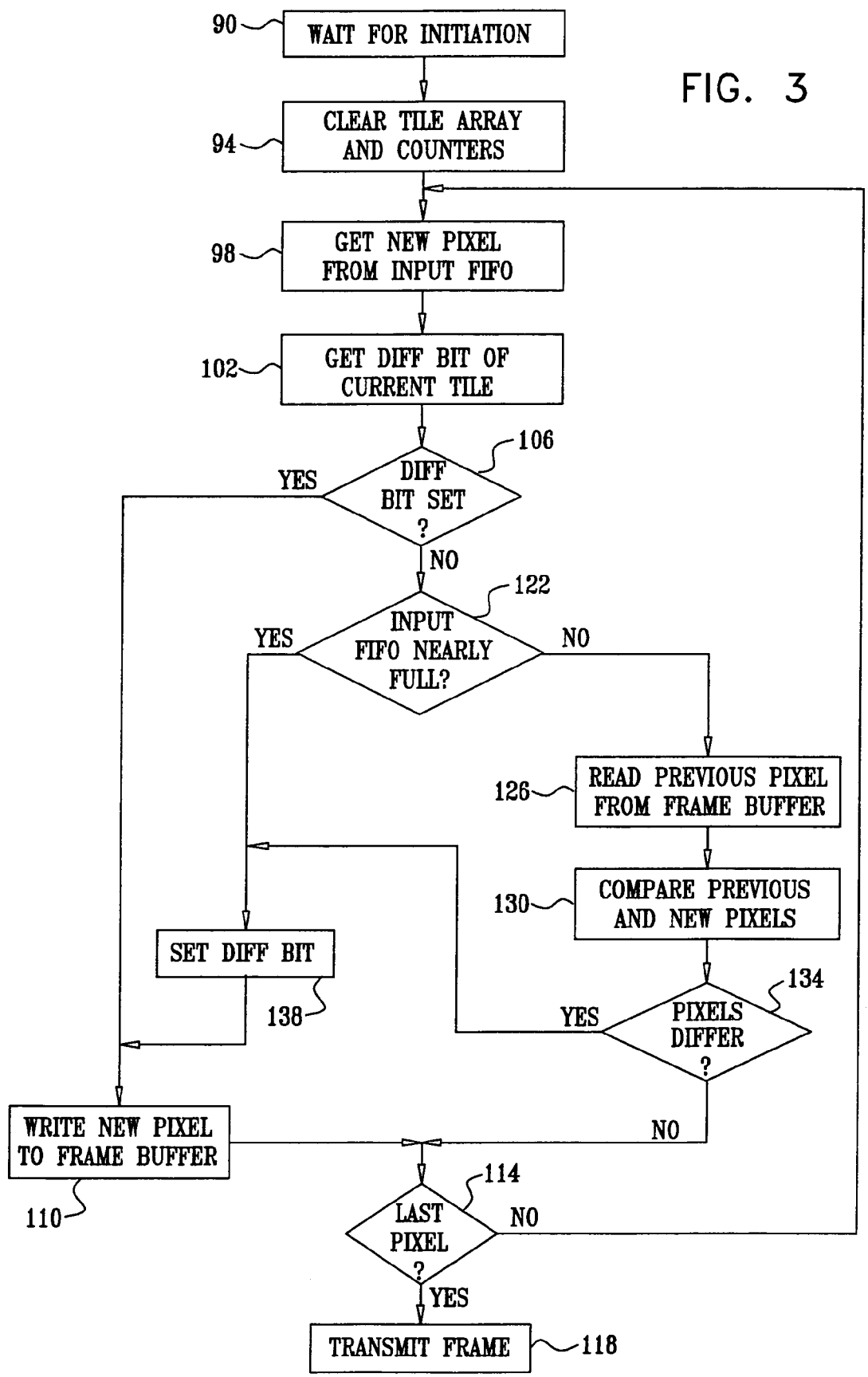
FIG. 3 is a flow chart that schematically illustrates a method for capturing video frames, in accordance with an embodiment of the present invention.

FIG. 3 is a flow chart that schematically illustrates a method, carried out by capture processor 34, for capturing video frames, in accordance with an embodiment of the present invention. The method begins with the capture processor waiting to be initiated, at a standby step 90. In some embodiments, such as when processor 34 operates in accordance with the RFB protocol cited above, processor 34 captures each video frame responsively to an instruction sent from controlling computer 28. In these embodiments, processor 34 waits in step 90 until instructed to capture a video frame. In alternative embodiments, processor 34 may capture and transmit video frames without an explicit instruction for each frame. For example, the instruction to capture a new video frame may be given by embedded controller 64. In such cases, step 90 can be omitted.

In some embodiments, processor 34 comprises one or more pixel counters that indicate the location, or coordinates, of the currently-read pixel in the frame. In some embodiments, processor 34 maintains two counters corresponding to the vertical and horizontal coordinates of the currently-read pixel. In particular, processor 34 associates each current pixel read from input FIFO 42 with the tile it belongs to by using the pixel counter values.

In preparation for capturing the current frame, processor 34 initializes tile array 58 and resets the pixel counters, at an initialization step 94. In some embodiments, all bits in tile array 58 are cleared. Alternatively (such as when pre-identifying high activity tiles, as described above) embedded controller 64 may sets certain bits of tile array 58 a-priori.

At this stage, it is assumed that a reference frame in already stored in frame buffer 46. Typically, if no reference frame is available in frame buffer 46 (for example when capturing the first video frame after a long period of inactivity) then an initial video frame is first captured into the frame buffer and is sent in its entirety as output data to the controlling computer.

Capture processor 34 now begins a loop (comprising steps 98-114 below) that simultaneously captures and compresses the current frame. As noted above, pixel values of the currently-captured frame are written in-place into appropriate locations in the same frame buffer 46 holding the reference frame, thus using only a single frame buffer. When the loop terminates at step 114 below, the current frame is available in frame buffer 46 and can serve as a reference frame for capturing and compressing the next frame.

Capture control module 44 reads the value of the next current pixel from input FIFO 42, at a FIFO reading step 98. With each pixel value read, module 44 increments the pixel counters. Module 44 performs the appropriate calculation to identify the tile of the current frame to which the current pixel belongs. In the description below, this tile will be referred to as the "present tile." Module 44 then reads the difference bit corresponding to the present tile from tile array 58, at a difference bit reading step 102.

As noted above, each difference bit is used to indicate whether the present tile of the currently-captured frame contains pixel values that differ from their respective reference pixel values stored in the frame buffer. Module 44 checks the status of the difference bit corresponding to the present tile, at a difference bit checking step 106. If the difference bit is set, module 44 concludes that at least one current pixel value in the present tile was already found to be different from its corresponding reference pixel value. In this case, the present tile will subsequently be transmitted to the controlling computer, regardless of whether the currently-read pixel value has changed or not.

Thus, module 44 writes the currently-read pixel value into the appropriate location in frame buffer 46, replacing the corresponding reference pixel value, at a pixel updating step 110. Note that the current pixel value is written to the frame buffer without comparing it to the corresponding reference pixel value (a comparison which would have required an additional read operation from the frame buffer). Using this mechanism, the rate of read operations from the frame buffer over memory bus 52 is reduced significantly.

After updating the current pixel value, module 44 checks whether the currently-read pixel is the last pixel in the currently-captured frame, at a last pixel checking step 114. If the entire frame has been captured, module 44 formats the changed tiles, as indicated in tile array 58, into output data and transmits the output data to the controlling computer, at a transmission step 118. (An alternative embodiment in which changed tiles are transmitted as soon as they are captured is described in detail below.) If, on the other hand, there are remaining pixels to be read, the method loops back to step 98 above to read the next pixel.

The description now returns to the alternative outcome of difference bit checking step 106. If the difference bit, as checked at step 106, is not set, module 44 concludes that no pixel variations (between the current and reference frames) have been found so far in the present tile. (For the sake of clarity, the method description temporarily defers the description of step 122. This step and the mechanism it provides are described further below.) Module 44 now goes to determine whether the currently-read pixel value should be updated, i.e., written to the frame buffer. Module 44 reads the reference pixel corresponding to the currently-read pixel from frame buffer 46, via memory bus 52, at a reference reading step 126.

Module 44 uses subtractor 56 to determine whether the current pixel value differs from the corresponding reference pixel value, at a comparison step 130. If a pixel variation is found, as checked at a pixel variation checking step 134, module 44 marks the tile in question as a "changed tile" by setting the corresponding difference bit in tile array 58, at a tile array updating step 138. Module 44 then updates the currently-read pixel value in frame buffer 46 at pixel updating step 110, from which the method continues as described above. If a pixel variation is not found at step 134, the method goes to last pixel checking step 114 and continues in accordance with the description given above.

We shall now return to describe step 122, which was previously skipped. As noted above, the rate of pixel values written into input FIFO 42 is constant. The rate of pixel values read out of FIFO 42 is, however, variable, and depends upon the activity profile of capture control module 44. For example, it can be appreciated from examining FIG. 3 above that when pixel variations are dispersed over many tiles in the frame, module 44 performs a higher number of pixel value comparisons and read operations from the frame buffer. In such cases, the rate at which module 44 is able to read current pixel values from FIFO 42 is reduced. Thus, at peak activity periods of module 44, the rate in which FIFO 42 fills up may be higher than the rate in which it is emptied. This effect may cause the FIFO to overflow. Since a FIFO overflow normally causes the entire current video frame to be dropped, it is highly desirable to avoid such overflows.

In order to prevent input FIFO 42 from overflowing, in some embodiments, module 44 checks whether the FIFO is nearly full, at a FIFO status checking step 122. In some embodiments, FIFO 42 comprises a FIFO filling threshold circuit that triggers an indication when the FIFO is nearly full. The threshold value may be either hard-wired or programmable, and may be set to any desired percentage of the FIFO capacity. If at any given time FIFO 42 is found to be nearly full, as checked at step 122, module 44 artificially forces a setting of the difference bit of the present tile by jumping to tile array updating step 138. This forced setting of the difference bit is performed regardless of whether a true pixel variation exists or not. From this stage, the method continues in accordance with the description given above.

As a result of the forced setting of the difference bit, all subsequent pixel values belonging to the present tile will be written into the frame buffer without performing the read and compare operations of steps 126 and 130, thereby reducing the number of read and compare operations required of module 44. Module 44 thus has more available resources, which are used to increase the rate of reading pixel values from FIFO 42 so as to prevent it from overflowing. When reading subsequent pixel values from FIFO 42, difference bits of subsequent tiles will continue to be artificially set until the FIFO is no longer nearly full. Although this FIFO control mechanism may cause a higher number of tiles to be marked as changed tiles and to be transmitted to the controlling computer, it prevents FIFO overflow events and reduces memory peak performance requirement. As noted above, the pre-identification of high activity tiles has a similar effect of reducing the rate of read and compare operations, thus reducing the probability of FIFO overflow.

For the sake of simplicity, FIG. 3 shows a sequence of steps in which the output data is formatted and transmitted to the controlling computer at step 118, after the entire frame has been captured and stored in frame buffer 46. In many practical cases, however, it is desirable to reduce the latency of the process (i.e., the average time delay between capturing a pixel to transmitting the pixel value to the controlling computer). For example, in some KVM applications, the operator remotely controls mouse movements in response to the displayed screen image. In such applications, it is typically important to reduce the latency added to the mouse response time by the remote control system.

In some embodiments, in order to reduce the overall latency of the capturing-compression-transmission process, parts of the compressed frame can be transmitted to the controlling computer before the entire frame has been processed. For example, in some embodiments, the pixel values of a changed tile can be transmitted to the controlling computer as soon as the entire tile has been captured and updated in the frame buffer, without waiting for subsequent tiles to be processed.

As noted above, the combined capturing and compression method of FIG. 3 significantly reduces the rate of read and write operations to and from frame buffer 46, in comparison to conventional methods. In the method of FIG. 3, a read operation is performed only when no previous pixel variations have yet been found within the present tile. A write operation is performed in two cases, namely (1) when the present tile already contains pixel variations and (2) when no previous pixel variation occurred so far in the present tile, and the currently-read pixel value is found to differ from its corresponding reference pixel value.

A convenient figure-of-merit that can be used to compare different capture and compression methods is the average number of read and write operations performed per pixel in frame buffer 46. This average number is denoted R herein. For example, a simple frame capture, without compression, uses one write operation per pixel, or R=1. A conventional capturing and compression method that compares each current pixel value with its corresponding reference pixel value uses one read and one write operation for each pixel, or R=2.

The performance of the method of FIG. 3 is variable, and depends, for example, on the characteristics of the reference and current frames and the differences between them, the distribution of pixel variations across the frame, the tile size, the threshold value of the FIFO control mechanism, the comparison mechanism used by subtractor 56, etc.

For example, when the current frame does not change in comparison with the reference frame, only read operations will be performed (i.e., R=1). At the other extreme, when all of the pixels in the current frame change with respect to the reference frame, R depends on the tile size. For 16×16 pixel tiles, there will be, on average, 1/256 read operations and 1 write operation performed per pixel, or a total of R=(257/256), slightly higher than R=1. For typical computer-generated video display frames, the average number of write and read operations to and from frame buffer 46 using the method of FIG. 3 will be in between R=1 and R=257/256 when using 16×16 pixel tiles.

In some embodiments, capture processor 34 may read ahead 16 pixels of a certain tile before performing comparisons. In these embodiments, the upper limit of R becomes R=17/16, because pixel values are read from memory until the first different pixel value is encountered.

Because of the reduced rate of read and write operations, the cost and complexity of memory bus 52 and of external memory 48 holding frame buffer 46 can be significantly reduced. Whereas a conventional capturing and compression method having R=2 would typically require a dedicated 32 bit double data rate (DDR) bus and a corresponding high-speed DDR memory, using the method of FIG. 3 comparable performance can be achieved using only a 16 bit memory bus and a 16 bit DDR memory, thus enabling the use of lower cost memory. In some cases, the relaxed performance required of bus 52 and memory 48 enables the frame buffer to be implemented in an on-chip memory, internally to capture processor 34. The on-chip memory may comprise a dynamic RAM (DRAM) array or any other suitable memory device. This higher integration level further reduces the cost, size, power dissipation, latency and memory requirements of processor 34.

Although the methods and devices described herein mainly relate to the capturing and compression of video images, the principles of the present invention can be used in any image capturing application that involves comparison of a currently-captured image with a reference image. Such additional applications may comprise, for example, graphics and/or computer screen video broadcasting.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for capturing images that include pixels, the method comprising:

dividing the images into tiles, each tile comprising a group of the pixels, responsively to respective locations of the pixels in the images;

accepting an input data sequence representing respective current values of the pixels of a currently-captured image frame;

within each of at least some of the tiles, comparing the current values with respective reference values of the pixels of a reference frame stored in a frame buffer in order to detect variations between the current and reference values and, when a variation is detected at a given pixel, writing the current value into the frame buffer in place of a corresponding reference value and marking the tile as a changed tile; and writing the current values of the pixels belonging to the changed tile subsequent to the given pixel in the input data sequence into the frame buffer without comparing the current values of the subsequent pixels to the respective reference values, thereby replacing the reference frame with the currently-captured image frame in the frame buffer, wherein comparing each of the current values with the respective reference value comprises performing at least one read operation from the frame buffer, wherein writing each of the current values comprises performing at least one write operation to the frame buffer, and wherein an average number of the read and write operations performed per pixel is no greater than 17/16.

2. The method according to claim 1, wherein dividing the images into the tiles comprises, while accepting the input data sequence, advancing one or more pixel counters that indicate the respective locations of the current pixels in the currently-captured image frame, and determining an association between the pixels and the tiles responsively to values of the one or more pixel counters.

3. The method according to claim 1, wherein comparing the current values with the reference values comprises calculating differences between the current and reference values, and comparing the differences to a difference threshold so as to detect the variations.

4. The method according to claim 1, wherein dividing the images into the tiles comprises representing the tiles by a tile array comprising a bit matrix, and wherein marking the tile as a changed tile comprises setting a respective bit associated with the tile in the bit matrix.

5. The method according to claim 1, wherein accepting the input data sequence comprises storing at least some of the current pixel values in an input FIFO, and wherein the method comprises:

comparing a number of the pixel values stored in the input FIFO to a FIFO filling threshold; and when the number of the pixel values in the input FIFO exceeds the FIFO filling threshold, marking the tile associated with a currently-read pixel as a changed tile.

6. The method according to claim 1, wherein the average number of the read and write operations performed per pixel is no greater than 257/256.

7. A method for transferring video frames that include pixels from a remote computer to a controlling computer, the method comprising:

dividing the video frames into tiles, each tile comprising a group of the pixels, responsively to respective locations of the pixels in the video frames;

at the remote computer, accepting an input data sequence representing respective current values of the pixels of a currently-captured video frame;

within each of at least some of the tiles, comparing at the remote computer the current values with respective reference values of the pixels of a reference frame stored in a frame buffer to detect variations between the current and reference values and, when a variation is detected at a given pixel, writing the current value into the frame buffer in place of a corresponding reference value and marking the tile as a changed tile;

at the remote computer, writing the current values of the pixels belonging to the changed tile subsequent to the given pixel in the input data sequence into the frame buffer without comparing the current values of the subsequent pixels to the respective reference values, thereby replacing the reference frame with the currently-captured image frame in the frame buffer; and transmitting at least some of the changed tiles over a communication link from the remote computer to the controlling computer, including transmitting a given changed tile to the controlling computer in parallel to a processing of tiles subsequent to the given tile in the currently-captured video frame.

8. The method according to claim 7, and comprising reconstructing the video frames responsively to the changed tiles at the controlling computer.

9. The method according to claim 8, and comprising controlling the remote computer from the controlling computer using the reconstructed video frames.

10. The method according to claim 7, and comprising identifying a high activity tile corresponding to a frequently-changing region in the video frames, and marking the high activity tile as a changed tile so as to cause the current values of the pixels belonging to the high activity tile to be written to the frame buffer without comparing them to the respective reference values.

11. Apparatus for capturing images that include pixels, comprising:

a memory controller, which is arranged to write and read pixel values into and out of a memory holding a frame buffer; and a capture control module, which is arranged to divide the images into tiles, each tile comprising a group of the pixels, responsively to respective locations of the pixels in the images, to accept an input data sequence representing respective current values of the pixels of a currently-captured image frame, to compare within each of at least some of the tiles the current values with respective reference values of the pixels of a reference frame stored in the frame buffer in order to detect variations between the current and reference values and, when a variation is detected at a given pixel, to write the current value into the frame buffer in place of a corresponding reference value, to mark the tile as a changed tile, and to write the current values of the pixels belonging to the changed tile subsequent to the given pixel in the input data sequence into the frame buffer without comparing the current values of the subsequent pixels to the respective reference values, thereby replacing the reference frame with the currently-captured image frame in the frame buffer, wherein the capture control module is further arranged to invoke the memory controller to perform at least one read operation from the frame buffer when comparing each of the current values with the respective reference value, and to invoke the memory controller to perform at least one write operation to the frame buffer when writing each of the current values, wherein the average number of the read and write operations performed per pixel is no greater than 17/16.

12. The apparatus according to claim 11, wherein the capture control module comprises one or more pixel counters for indicating the respective locations of the current pixels in the currently-captured image frame, and wherein the capture control module is arranged to advance the one or more pixel counters while accepting the input data sequence and to associate between the pixels and the tiles responsively to values of the one or more pixel counters.

13. The apparatus according to claim 11, and comprising a subtractor, which is arranged to compare the current values with the reference values by calculating differences between the current and reference values and comparing the differences to a difference threshold so as to detect the variations.

14. The apparatus according to claim 11, and comprising a tile array comprising a bit matrix representing the tiles, wherein the capture control module is arranged to mark the tile as a changed tile by setting a respective bit associated with the tile in the bit matrix.

15. The apparatus according to claim 11, and comprising an input FIFO, which is arranged to hold at least some of the current pixel values accepted in the input data sequence, wherein the capture control module is arranged to compare a number of the pixel values stored in the input FIFO to a FIFO filling threshold and, when the number of the pixel values in the input FIFO exceeds the FIFO filling threshold, to mark the tile associated with a currently-read pixel as a changed tile.

16. The apparatus according to claim 11, and comprising an embedded controller, which is arranged to identify a high activity tile corresponding to a frequently-changing region in the images, and to mark the high activity tile as a changed tile so as to cause the current values of the pixels belonging to the high activity tile to be written to the frame buffer without comparing them to the respective reference values.

17. The apparatus according to claim 11, wherein the average number of the read and write operations performed per pixel is no greater than 257/256.

18. A computer, comprising:
   a memory, which is arranged to hold a frame buffer for storing reference pixel values of a reference image frame; and
   a capture processor for capturing images that include pixels generated at the computer, which is arranged to divide the images into tiles, each tile comprising a group of the pixels, responsively to respective locations of the pixels in the images, to accept an input data sequence representing respective current values of the pixels of a currently-captured image frame, to compare within each of at least some of the tiles the current values with the respective reference values stored in the frame buffer in order to detect variations between the current and reference values and, when a variation is detected at a given pixel, to write the current value into the frame buffer in place of a corresponding reference value, to mark the tile as a changed tile, and to write the current values of the pixels belonging to the changed tile subsequent to the given pixel in the input data sequence into the frame buffer without comparing the current values of the subsequent pixels to the respective reference values, thereby replacing the reference frame with the currently-captured image frame in the frame buffer,
   wherein the capture processor is arranged to perform at least one read operation from the frame buffer when comparing each of the current values with the respective reference value, and to perform at least one write operation to the frame buffer when writing each of the current values, wherein the average number of the read and write operations performed per pixel is no greater than 17/16.

19. The computer according to claim 18, wherein the capture processor comprises an input FIFO, which is arranged to hold at least some of the current pixel values accepted in the input data sequence, and wherein the capture processor is arranged to compare a number of the pixel values stored in the input FIFO to a FIFO filling threshold and, when the number of the pixel values in the input FIFO exceeds the FIFO filling threshold, to mark the tile associated with a currently-read pixel as a changed tile.

20. A system for transferring video frames that include pixels, comprising:
   a remote computer, comprising:
      a memory, which is arranged to hold a frame buffer for storing reference pixel values of a reference video frame;
      a capture processor, which is arranged to divide the frames into tiles, each tile comprising a group of the pixels, responsively to respective locations of the pixels in the frames, to accept an input data sequence representing respective current values of the pixels of a currently-captured frame, to compare within each of at least some of the tiles the current values with the respective reference values stored in the frame buffer in order to detect variations between the current and reference values and, when a variation is detected at a given pixel, to write the current value into the frame buffer in place of a corresponding reference value, to mark the tile as a changed tile, and to write the current values of the pixels belonging to the changed tile subsequent to the given pixel in the input data sequence into the frame buffer without comparing the current values of the subsequent pixels to the respective reference values, thereby replacing the reference frame with the currently-captured frame in the frame buffer; and
      a communication controller, which is arranged to transmit output data comprising at least some of the changed tiles over a communication link, wherein a given changed tile is transmitted to the controlling computer in parallel to processing of tiles subsequent to the given tile in the currently-captured video frame; and
   a controlling computer, which is arranged to receive the at least some of the changed tiles transmitted over the communication link and to reconstruct the currently-captured video frame responsively to the received output data.

21. The system according to claim 20, wherein the controlling computer is arranged to control the remote computer using the reconstructed video frames.

* * * * *